United States Patent [19]

Sheahan

[11] Patent Number: 4,941,160
[45] Date of Patent: Jul. 10, 1990

[54] FREQUENCY MULTIPLIER CIRCUITRY AND METHOD

[75] Inventor: Thomas J. Sheahan, Cary, Ill.

[73] Assignee: Digital Appliance Controls, Inc., Hoffman Estates, Ill.

[21] Appl. No.: 331,733

[22] Filed: Mar. 31, 1989

[51] Int. Cl.$^5$ .................................................. H03K 21/40
[52] U.S. Cl. ......................................... 377/28; 377/47
[58] Field of Search ........................ 377/28, 47, 51, 52

[56] References Cited

U.S. PATENT DOCUMENTS

| | | | |
|---|---|---|---|
| 4,017,719 | 4/1977 | Kaplin et al. | 377/47 |
| 4,086,471 | 4/1978 | Takahashi | 377/47 |
| 4,115,687 | 9/1978 | Boese et al. | 377/47 |
| 4,339,722 | 7/1982 | Sydor et al. | 377/47 |
| 4,773,031 | 9/1988 | Tobin | 377/47 |

Primary Examiner—John S. Heyman
Attorney, Agent, or Firm—Douglas B. White

[57] ABSTRACT

Generally there is provided circuitry and a method for frequency multiplication of a first signal source including a first counter for counting pulses from a second signal of higher frequency by counting from a loaded value and generating a circuit output each time the first counter resets. A second counter is used to count cycles of the first counter and generate a feedback signal when a predetermined number of cycles have been completed (the system multiplication factor). Calibration is achieved by comparing the end of the period of the first signal to the occurrence of a feedback signal. In response the comparision circuit causes the loaded value to be changed to thereby control the output.

6 Claims, 2 Drawing Sheets

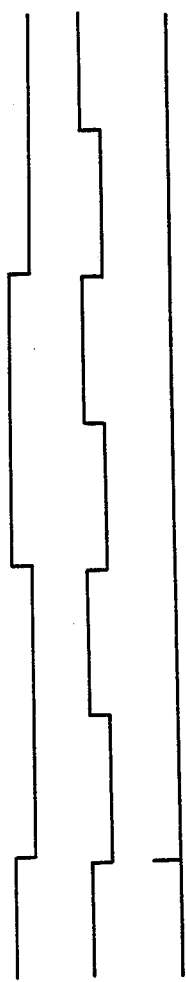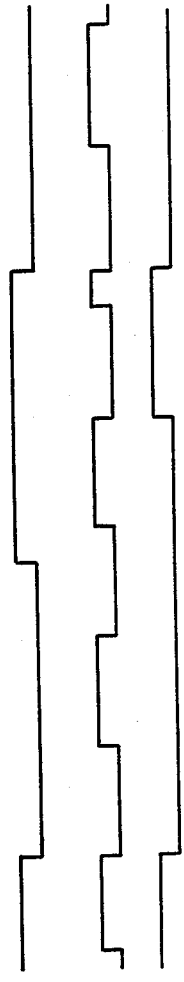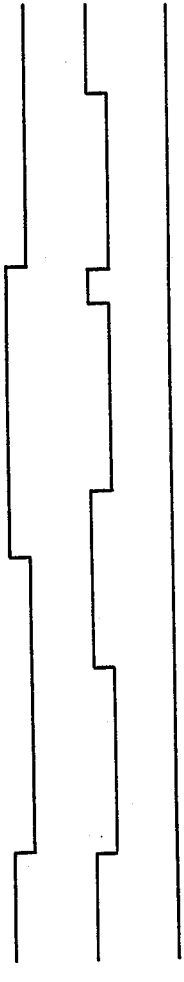
FIG. 2a
BASE CLOCK SIGNAL
MASTER COUNTER OUTPUT SIGNAL
FEEDBACK SIGNAL
FIG. 2b
BASE CLOCK SIGNAL
MASTER COUNTER OUTPUT SIGNAL
FEEDBACK SIGNAL
FIG. 2c
BASE CLOCK SIGNAL
MASTER COUNTER OUTPUT SIGNAL
FEEDBACK SIGNAL

FREQUENCY MULTIPLIER CIRCUITRY AND METHOD

BACKGROUND OF THE INVENTION

1. Field of the Invention

This invention relates generally to circuitry for multiplying signal frequency. More particularly this invention relates to a self calibrating frequency multiplier which is operable with an accurate low frequency signal source and a less accurate high frequency clock source to provide economical yet accurate high frequency output.

2. Description of the Prior Art

Frequency multiplication has been disclosed using reference oscillators to provide multiplication of an input signal source. Particularly, the traditional system uses a first reference oscillator to drive a first counter to measure the input signal period. A second reference oscillator is used to drive a second counter, and when the second counter resets it generates an output pulse. The count at which the second counter resets is controlled by the count of the first counter. This type of system was described in U.S. Pat. No. 3,798,584. Later an improved system eliminated the second reference oscillator by using a look-up table to determine the reset count. This modification is described in U.S. Pat. No. 3,970,954. The attractiveness of multipliers of this type is that they track the input signal closely and respond quickly to changes in the input frequency. In these designs, however, relatively accurate reference oscillators have been required and no provision is made to synchronize or calibrate the output relative to the input.

SUMMARY OF THE INVENTION

It is therefore a principal objective of the present invention to provide a frequency multiplication circuit which provides an accurate output relative to, and in synchronization with, the input signal.

It is a further object to provide such a multiplier that does not require an accurate high frequency reference oscillator.

Generally there is provided a frequency multiplying circuit including:
- a first signal source providing an accurate low frequency;
- a second signal source providing a high frequency;
- a first counter for counting the pulses of the second frequency by counting from a loaded value and then resetting to the reload value, a circuit output being generated each time the first counter resets;
- a second counter for counting the cycles of the first counter and generating a feedback signal when a predetermined number of cycles have been completed (the system multiplication factor); and
- a comparison circuit coupled to receive the feedback signal and the first signal source, to detect the end of a period of the first signal and to determine if a feedback signal has occurred within that period. In response the comparison circuit causes the loaded value to increment if the feedback signal occurred within the period, and causing the loaded value to decrement if the feedback signal did not occur.

Consequently the loaded value of the first counter is modified depending on whether it is necessary to increase or decrease the frequency of the output. If the desired frequency multiplication does not occur within the prescribed period of the input, the count is decreased and the output frequency thereby increased. If the desired frequency multiplication does occur within the time period, then the count is increased and the output frequency thereby decreased. The result is a slight oscillating variation around the target frequency, the target being a multiplication of the input signal frequency. Since this system recalibrates with every period of the low frequency base signal, the system error is plus or minus the low base frequency divided by the high frequency source and multiplied by the system multiplication value.

BRIEF DESCRIPTION OF THE DRAWINGS

FIG. 2a presents a timing diagram of the operation of the circuit of FIG. 1 in a multiplied-by-two example where the output is accurate and in synchronization with the input.

FIG. 2b depicts a timing diagram of the operation of the circuit of FIG. 1 in a multiplied-by-two example where the output frequency is too high.

FIG. 2c depicts a timing diagram of the operation of the circuit of FIG. 1 in a multiplied-by-two example where the output frequency is too low.

Figure 1:
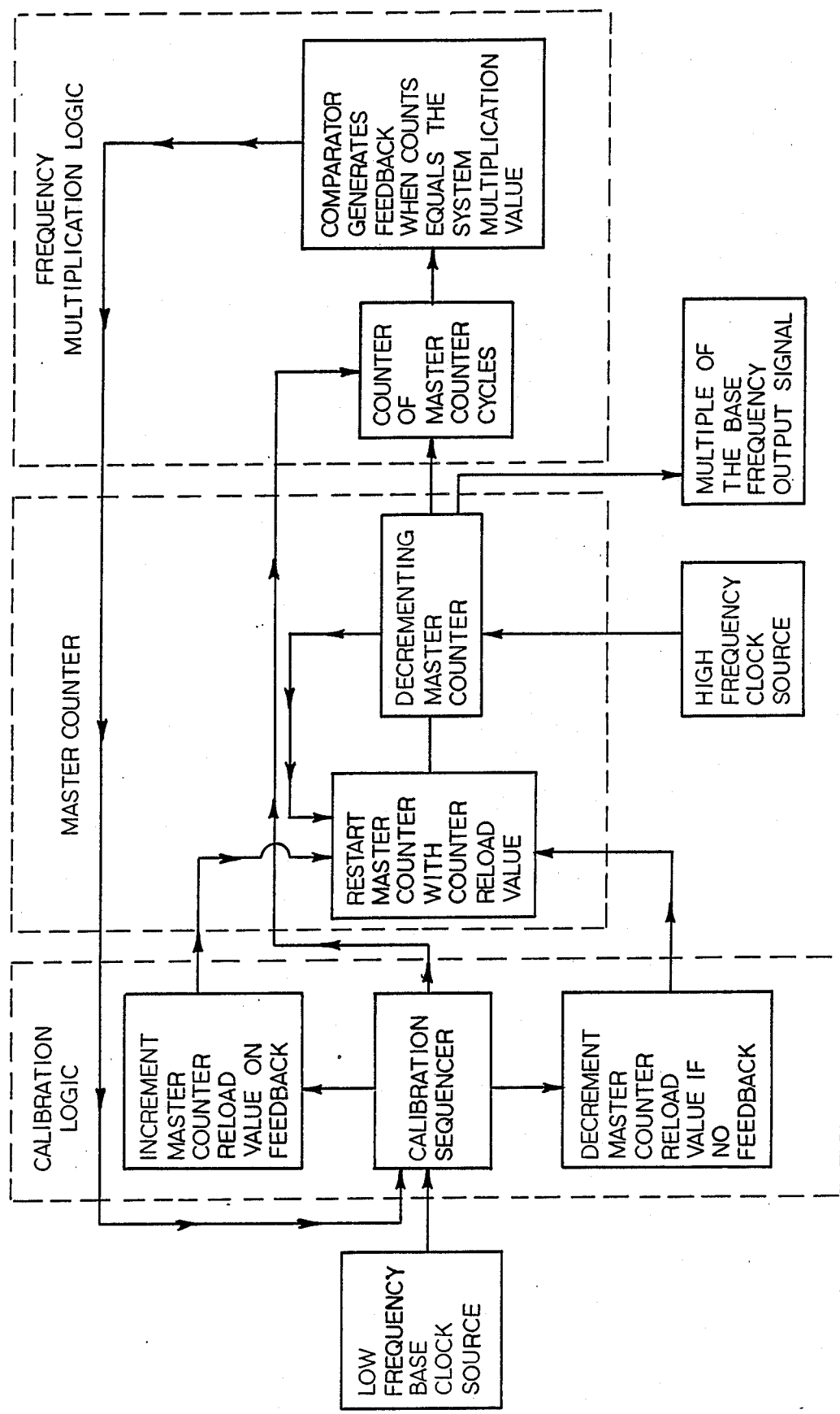
FIG. 1 depicts a combined block diagram and flow diagram of the frequency multiplying circuit and method of the present invention.

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims.

DESCRIPTION OF THE PREFERRED EMBODIMENT

Turning first to FIG. 1 there is shown a combined block diagram and flow diagram of the circuitry and method of the present invention. While in the preferred embodiment a microprocessor is used and the steps discussed herein are preformed with programmed instructions, it is clearly within the scope of the invention to implement this circuit with other components or a combination of such components with a microprocessor. Similarly, incrementing counters may be replaced with decrementing counters without deviating from the scope of this invention. In the present embodiment the low frequency source is a 60hz signal obtained from the power source and shaped to produce a 60hz square wave. The high frequency source is the microprocessor clock source.

The master counter of this device is an incrementing counter which operates to count pulses from the high frequency clock used with the microprocessor. In this embodiment the counter starts with a preset loaded value and then increments with each clock pulse. Each time this master counter overflows the counter is restarted with the load value and an output pulse is generated. The frequency of this output signal will be a multiple of the low frequency source.

Calibration and synchronization (correction) of the output signal is achieved with the frequency multiplication logic and the calibration logic. Each time the master counter resets and an output pulse is generated, a signal is transmitted to a secondary counter which is arranged to count the master counter cycles. This secondary counter is reset each time it reaches the system multiplication factor and restarted at line-cross by the calibration sequencer. When this secondary counter resets, a feedback signal is generated and fed to the calibration logic (a status flag is set in the microprocessor's internal RAM).

The calibration sequencer is a line-cross detector which operates to receive the feedback signal (check for the flag) and compare the timing of that occurrence with the negative edge detected on the low frequency (base clock) source. In this embodiment the negative edge sets a microprocessor interrupt. At the occurrence of the negative edge indicating the end of the period of the base signal, the master counter is reset and a count value is reloaded. If the feedback signal appeared (flag was set) within that detected period, the count to be loaded into the master counter is decremented. If the feedback signal is not detected within that period, then the reload value of the master counter is incremented.

Turning now to the timing diagram of FIG. 2 there is shown an operation of the present circuit where a base input signal is multiplied by two. Particularly, FIG. 2a represents an accurate multiplied output where the master counter output signal is precisely in synchronization with the input signal. When the secondary counter counts two master counter cycles, it generates the feedback signal which will coincide with the negative edge of the base clock signal.

FIG. 2b represents the situation where the high frequency source is running a little fast. The master counter is completing its two cycles early, well within the base signal period. The feedback signal generated after two cycles is read at the next base clock signal negative edge and operates to decrement the reload value of the master counter. This results in a longer reload count in the master counter and will stretch out the master counter output signal in the form of either FIG. 2a or FIG. 2c.

FIG. 2c shows a timing diagram occurring when the master counter output signal frequency is too low. No feedback signal is generated within the base signal period and the absence of feedback when read at the next base clock negative edge causes the master counter reload value to be incremented. This results in a shorter reload count in the master counter.

The programming of the microprocessor to accomplish the foregoing circuit and method is as follows:
1. On power up, reset the master counter and load a default value into the timer (master counter) reload buffer.
2. Enable the timer interrupt and the base signal negative edge interrupt.
3. Wait on the base signal negative edge interrupt.
4. Mask the timer interrupt and process the reload correction function as follows:
   a. If the feedback signal (status flag) occurred, decrement the reload value.
   b. If the feedback signal (status flag) did not occur, increment the timer reload value.
   c. Reset the feedback signal (status flag).
   d. Reset a second counter which sets the feedback signal (status flag) after a fixed number of timer interrupts representing the system multiplication value.
5. Load the new reload value into the timer (master counter) reload buffer and enable the timer interrupt.
6. Operate a second counter in the timer interrupt service routine that sets the feedback signal (status flag) if a number of timer interrupts equivalent to the system multiplication value occurred.
7. Return to step 2.

From the foregoing description, it will be apparent that modifications can be made to the circuitry and method for using same without departing from the teachings of the present invention. Accordingly the scope of the invention is only to be limited as necessitated by the accompanying claims.

I claim:
1. A frequency multiplying circuit comprising:
a first signal source having a first frequency;
a second signal source having a second frequency;
first counter means arranged to count cycles of said second frequency source, said counter operating to count from a loaded value and then to reset at the end of said count;
means to generate an output signal each time said first counter resets, the frequency of said output signal being a multiple of said frequency of said first signal; and
correction means arranged to monitor said frequency of said output and to change said loaded value in response thereto, wherein said correction means includes second counter means arranged to count cycles of said first counter means and further includes means to change said loaded value in response to the timing of said counted cycles.

2. The frequency multiplying circuit of claim 1 wherein said correction means further comprises means to detect the period of said first signal source and to compare the timing of said counted cycles to said period of said first signal source.

3. The frequency multiplying circuit of claim 2 wherein said correction means further comprises means to generate a feedback signal at the completion of said counted cycles and means to detect the relative timing of the occurrence of said feedback signal and the occurrence of the end of said period of said first signal.

4. The frequency multiplying circuit of claim 3 wherein the end of said period of said first signal is determined by detecting the negative edge of said first signal.

5. A method of multiplying the frequency of a first signal source comprising the steps of:
loading a starting value into a first counter;
counting with said first counter with each cycle of a second signal source;
resetting said first counter at the end of said count;
generating an output signal each time said first counter resets; and
monitoring the frequency of said output and changing said loaded value in response thereto, said monitoring step including signal and determining the relative timing of the occurrence of said counted cycles and the occurrence of the end of said period of said first signal.

6. The method of multiplying the frequency of a first signal source of claim 5 further comprising the step of increasing said loaded value if said feedback signal occurs within said period of said first signal and decreasing said loaded value if said feedback signal does not occur within said period of said first signal.

* * * * *